US011279507B2

(12) United States Patent
Moessnang et al.

(10) Patent No.: US 11,279,507 B2
(45) Date of Patent: Mar. 22, 2022

(54) WORKING STATION FOR A PACKAGING MACHINE

(71) Applicant: MULTIVAC SEPP HAGGENMUELLER SE & CO. KG, Wolfertschwenden (DE)

(72) Inventors: Konrad Moessnang, Kempten (DE); Tobias Guggenberger, Memmingen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 16/931,023

(22) Filed: Jul. 16, 2020

(65) Prior Publication Data

US 2021/0016911 A1   Jan. 21, 2021

(30) Foreign Application Priority Data

Jul. 19, 2019   (DE) .......................... 102019210728.1

(51) Int. Cl.
   *B65B 47/08*   (2006.01)
   *B65B 35/20*   (2006.01)
   *B65G 47/91*   (2006.01)

(52) U.S. Cl.
   CPC .............. *B65B 35/20* (2013.01); *B65G 47/91* (2013.01)

(58) Field of Classification Search
   CPC .......... B65G 47/91; B65B 35/20; B65B 47/08
   USPC ................................ 198/468.8, 474.1, 621.2
   See application file for complete search history.

(56) References Cited

U.S. PATENT DOCUMENTS

| 2,877,801 | A | * | 3/1959 | Mercier | F15B 1/165 138/30 |
| 3,121,577 | A | | 2/1964 | Merriman | |
| 4,178,015 | A | * | 12/1979 | Merriman | F16F 9/0418 267/64.27 |
| 4,513,997 | A | * | 4/1985 | Garlapaty | F16L 33/00 285/242 |

(Continued)

FOREIGN PATENT DOCUMENTS

DE      694 17 412 T2    11/1999
DE   10 2006 049 067 A1    4/2008

(Continued)

OTHER PUBLICATIONS

German Search Report Dated Mar. 26, 2020, Application No. 10 2019 210 728.1, Applicant Multivac Sepp Haggenmueller SE & Co. KG, 6 Pages.

(Continued)

*Primary Examiner* — Douglas A Hess
(74) *Attorney, Agent, or Firm* — Brooks Kushman P.C.

(57) ABSTRACT

A working station for a packaging machine, wherein the working station has a lifting unit having a pressure source and a lifting actuator connected to the pressure source. The lifting actuator comprises a hose comprising a wall having an inner surface and an outer surface disposed opposite the inner surface, and a seal having a seal cap engaging the outer surface. The seal further comprises an insert engaging the inner surface. Furthermore, the seal clamps a clamping portion of the wall of the hose between the insert and the seal cap in a fluidtight, preferably gastight, manner.

20 Claims, 3 Drawing Sheets

(56) References Cited

U.S. PATENT DOCUMENTS

| | | | | |
|---|---|---|---|---|
| 5,205,110 A * | 4/1993 | Buchko | ............... | B26D 5/00 |
| | | | | 53/453 |
| 8,499,536 B2 * | 8/2013 | Bonneville | ............ | B65B 59/04 |
| | | | | 53/561 |
| 9,555,513 B2 * | 1/2017 | Schmeiser | ............... | B65B 9/04 |
| 9,617,025 B2 * | 4/2017 | Runte | ............... | B29C 51/30 |
| 10,507,626 B2 * | 12/2019 | Bonneville | ............ | B65B 7/162 |
| 2016/0332326 A1 | 11/2016 | Pope et al. | | |

FOREIGN PATENT DOCUMENTS

| | | |
|---|---|---|
| DE | 10 2018 205 891 B3 | 2/2019 |
| EP | 0 115 199 A1 | 8/1984 |
| EP | 3 246 261 A1 | 11/2017 |
| WO | 94/25372 A1 | 10/1994 |

OTHER PUBLICATIONS

European Search Report Dated Dec. 21, 2020 (with English Machine Translation), Application No. 20184953.6-1017, Applicant MULTIVAC Sepp Haggenmueller SE & Co. KG, 14 Pages.

\* cited by examiner

WORKING STATION FOR A PACKAGING MACHINE

CROSS-REFERENCE TO RELATED APPLICATIONS

This application claims foreign priority benefits under 35 U.S.C. § 119(a)-(d) to European patent application number DE 10 2019 210 728.1, filed Jul. 19, 2019, which is incorporated by reference in its entirety.

TECHNICAL FIELD

The disclosure relates to a working station for a packaging machine and to a packaging machine having such a working station.

BACKGROUND

A packaging machine comprising a bladder device for moving components of the packaging machine is known from EP 3 246 261 A1. Therein, a sealing station is disclosed, whose sealing plate is moved by the disclosed bladder device. The bladder device comprises a bladder, which is clamped together by chimps at opposite ends. The clamps each comprise two plates, which are clamped together by screws, such that portions of the bladder in between the plates are clamped by the clamps. The gas supply to the bladder is provided for in EP 3 246 261 A1 by a nipple stub, which is arranged in an opening in the side wall of the bladder. Therefore, in addition to the openings of the bladder sealed by the clamps, a further opening for the nipple stub is required. This is disadvantageous because the risk of erroneous scalings or scalings uptight through aging at the openings is increased. A further disadvantage is that recesses have to be provided in the sealing plate for the nipple stub and gas lines for its connection. In addition, the lilting height is limited proximate to the clamps because the clamps clamp the bladder together in a flat way.

SUMMARY

It is an object of the disclosure to provide an improved working station or packaging machine, respectively, which is improved with respect to the above-mentioned disadvantages. This object is achieved by a working station according to the disclosure as well as by a packaging machine according to the disclosure.

The disclosure provides a working station for a packaging machine. The working station has a lifting unit having a pressure source and a lifting actuator connected to the pressure source. The lifting actuator comprises a hose having a wall, which has an inner surface and an outer surface opposite the inner surface, as well as a seal having a seal cap, which engages the outer surface. The working station is Characterized in that the seal further comprises an insert, which engages the inner surface, wherein the seal clamps a clamping portion of the wall of the hose between the insert and the seal cap in a fluidtight, preferably gastight, manner.

This configuration has several advantages. For example, the supply of the actuator with a pressure medium through the seal may be enabled by the insert engaging the inner surface, such that an additional pressure medium supply running through the wall of the hose may be eliminated. Further, a lifting height of the lifting actuator proximate to the seal may be increased by providing the insert.

An elongate flexible hollow body having openings at opposite ends may be considered as a hose. A direction along the elongate extension of the hose may be considered an axial direction. The hose may be formed substantially by a wall of the hose. Said wall may define an inner space of the hose in radial directions. Said radial directions may be defined as orthogonal to the axial direction of the hose. Various devices may be considered a pressure source, for example a pump, a compressor, a central pressured air supply or, in case the device is not part of the lifting unit but e.g. of the packaging machine, a connection of the lifting unit, which is connectable to one of the above-mentioned devices.

In the axial direction, the inner space of the hose may be accessible through the opposite openings. In order to provide for a space sealed with respect to the environment of the hose, the opposite openings have to be sealingly closed. According to the disclosure, this may be effected by the seal at least on one opening. Both openings may each be closed in a gastight manner by a seal as well. Alternatively, one of the openings may for example be sewed in a gastight manner. In particular, the wall of the hose may limit the inner space of the hose in the radial directions and the seal may limit the inner space of the hose in the axial direction.

It is conceivable, that the seal cap has a recess, in which the insert is insertable. The recess may extend in the axial direction when the seal clamps the clamping portion of the wall. This may facilitate pressing the wall of the hose in the radial direction against a side wall of the recess, in particular by the insert.

It is advantageous, when an opening plane of the recess has an area, which is larger than the bottom surface of the recess. This may facilitate the insertion of the clamping portion of the wall of the hose into the recess.

It is conceivable, that the insert has a tapered portion. Thereby, a particularly effective clamping may be achieved. It is particularly beneficial, the entire insert is tapered.

The seal may have a connector, which is configured to conduct a working fluid, preferably a gas, particularly preferred air, through the seal into the hose and/or out of the hose. As already implied, this may allow to do without a pressure medium supply running through the wall of the hose. This is advantageous because in this way, openings to be sealed may be limited to the two end openings at the opposite ends of the hose. In addition, the need for arrangements for pressure medium connectors at surfaces facing the hose of the components to be lifted may be eliminated.

In a variant, the insert and the cap may be screwable to one another. This may enable a particularly easy and simple to implement way of achieving the clamping. At the same time, this may provide for a good adjustability of the clamping force.

It is conceivable that a pulling direction of the screw connection for screwing the seal cap to the insert is oriented in an angle with respect to the lifting direction of the lifting actuator, wherein the angle is larger than 0°, preferably larger than 45°, particularly preferred 90°.

In a further variant, two seals may be provided at opposite portions of the hose. In this way, the advantages explained with respect to the seal may be achieved at both ends of the hose. A connector as explained further above, may be provided at one or both or none of the seals. A lifting actuator having two seals each having a connector may have the advantage that a working fluid may be inserted and/or discharged more uniformly. This may prevent the component to be lifted from tilting.

The working station may for example be a sealing station or a cutting station or a forming station.

The disclosure is also directed to a packaging machine having a working station as described above.

BRIEF DESCRIPTION OF THE DRAWINGS

The disclosure is directed to a working station as well as a packaging machine as described above. In the following, an advantageous embodiment will be explained in more detail with reference to drawings.

DETAILED DESCRIPTION

Figure 1:
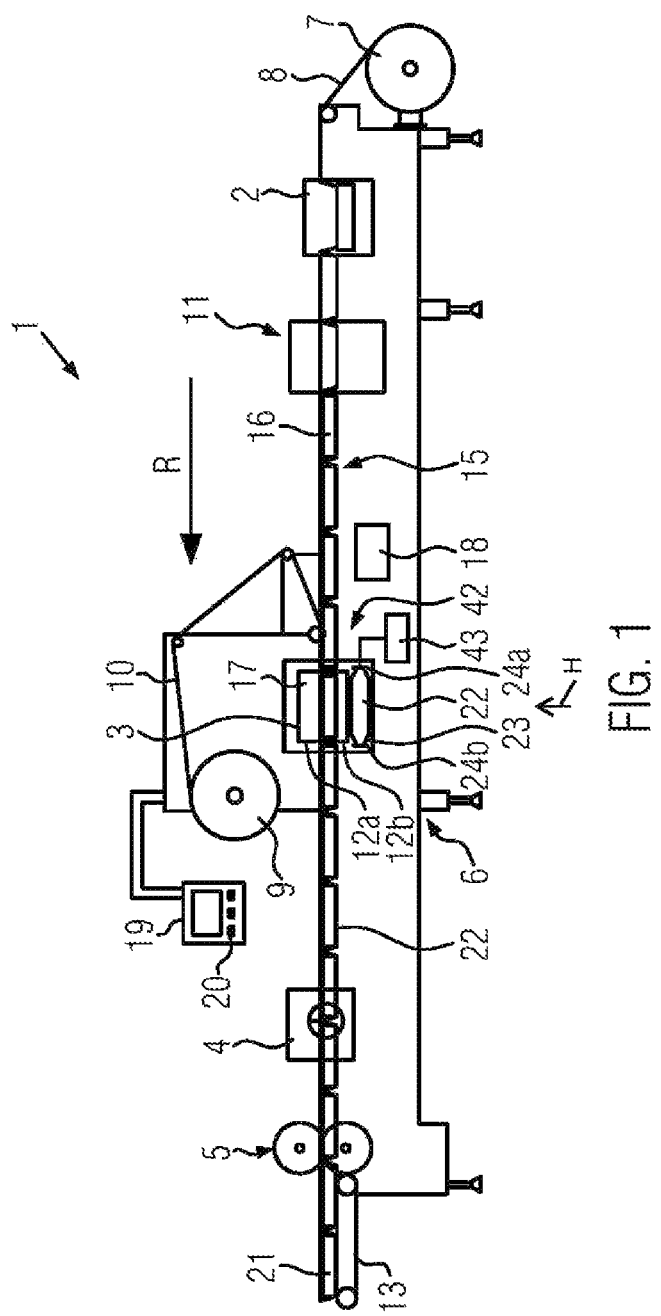
FIG. 1 shows a schematic side view of a packaging machine.

FIG. 1 shows a schematic view of a packaging machine 1, which may be a deep drawing packaging machine. The packaging machine 1 may have one or more working stations, in particular, as in the shown embodiment, a forming station 2, a sealing station 3, a transverse cutting device 4 and a longitudinal cutting device 5. It should be appreciated, that the packaging machine may have one or more of the listed working stations. These may be arranged in the above-mentioned sequence along a working direction R at a machine frame 6. Further, a leakage detection station 11 may be arranged downstream of the forming station 2 as a further working station.

At an input side a feed roll 7 may be provided at the machine frame 6. Said feed roll may have a first film 8 pulled off of it. In the area of the sealing station 3, a film stock 9 may be provided, of which a second film 10 may be pulled as a cover film. At a discharge side, a discharge device 13 for example a transport belt may be provided at the packaging machine, with which individualized packages may be discharged. Further, the packaging machine 1 may have a feeding device, which is not shown and which may grip the film 8 and transport it, such as in an indexed manner in the working direction R. The feeding device may be realized for example by laterally arranged transport chains, such as clamping chains.

As shown in the embodiment, the forming station 2 may be embodied as a deep drawing station. Therein, one or more packaging depressions 14 may be formed into the first film 8 by deep drawing. The forming station 2 may be operable such that a plurality of packaging depressions may be formed next to each other in a direction orthogonal to the working direction R. Downstream of the forming station 2 with respect to the working direction R, a filling lane 15 may be provided. There, the packaging depressions 14 formed in the first film 8 may be filled with product 16.

The sealing station 3 may comprise an upper tool 12a and a lower tool 12b. These may be configured to form a gas tightly sealable chamber 17, in which an atmosphere inside the packaging depressions 14 may be modified prior to sealing, for example by evacuation and/or gas flushing with an exchange gas or with an exchange gas mixture. As in the present embodiment, closure of the chamber 17 may occur by lifting the lower tool 12b and pressing it against the upper tool 12a.

For this purpose, sealing station 3 may comprise a lifting unit 42. The latter may include a pressure source 43. The lifting unit 42 may further have a lifting actuator 22, which may comprise a hose 23 and a first seal 24a and preferably a second seal 24b. The pressure source 43 may supply a working fluid to the lifting actuator 22. The working fluid may be filled into the hose 23 by the pressure source 43, such as by using a constant or variable pressure. Thereby, the volume of the hose 23 may be increased and the lower tool 12b may be lifted. As in the present embodiment, the working fluid may be air. The pressure source may, as shown here, be a pump or a compressor.

It should be appreciated that the arrangement of the lifting unit 42 and the lifting actuator 22, respectively, is an example. The lifting unit 42 and the lifting actuator 22, respectively, may be provided in any of the above-mentioned working stations, in particular in one, several or all of the mentioned working stations. Further, the lifting unit 42 and the lifting actuator 22, respectively, may be configured for lifting a component of a working station, for example the lower tool 12b, in a lifting direction H and/or for pressing down a component of a working station, for example the upper tool 12a.

The transverse cutting device 4 may be a die cutter, which may be adapted to cut the first film 8 and the second film 10 between neighboring packaging depressions 14 in a direction transverse to the working direction R. The transverse cutting device 4 may be configured such that the first film 8 is not cut along its entire width but such that at least an edge portion is not cut. This may enable a controlled transport by the feeding device.

The longitudinal cutting device 5 may, as in the shown embodiment, be embodied as a rotary circular knife assembly, with which the first film 8 and the second film 10 may be cut between neighboring packaging depressions 14 and at the lateral edge of the first film 8, whereby behind the longitudinal cutting device 5, individualized packages may be present. The transverse cutting device 4 and the longitudinal cutting device 5 may each be considered a working station, in particular a cutting station, or may be considered jointly as a working station, in particular a cutting station.

The packaging machine 1 may further comprise a control unit 18. It may be configured to control and/or monitor the processes running in the packaging machine 1. In addition, a display 19, which may have operating elements 20, may be provided and adapted for visualizing and/or influencing processes in the packaging machine 1 by an operator.

The general operation of the packaging machine 1 may occur as briefly explained in the following.

The first film 8 may be pulled off the feed roll 7 and transported by the feeding device into the forming station 2. In the forming station 2, one or more packaging depressions 14 may be formed into the first film 8 by deep drawing. The packaging depressions 14 may be indexed in a main working tact together with surrounding portions of the first film 8 to the leakage detection station 11. There, they may be checked for leakages, which may have occurred during forming for example. Afterwards, the packaging depressions 14 may be transported to the filling lane 15, where they are filled with product 16.

Afterwards, the filled packaging depressions 14, together with the portion of the first film 8 surrounding them, may be transported to the sealing station 3 by the feeding device. In the sealing station 3, the second film 10 may be sealed as a cover film to the first film 8. Subsequently, the second film 10 may be transported by the feeding movement of the first film 8. Here, the second film 10 may be pulled off the film stock 9. Sealed packages 21 may be formed by sealing the cover film 10 to the packaging depressions 14.

In the cutting devices 4, 5 the packages 21 may be individualized by cutting the films 8, 10 in transverse and longitudinal directions, respectively. A complete cut device (not shown), which can individualize the packages 21 in a single step, may be used as well instead of the cutting device 4, 5.

Figure 2:
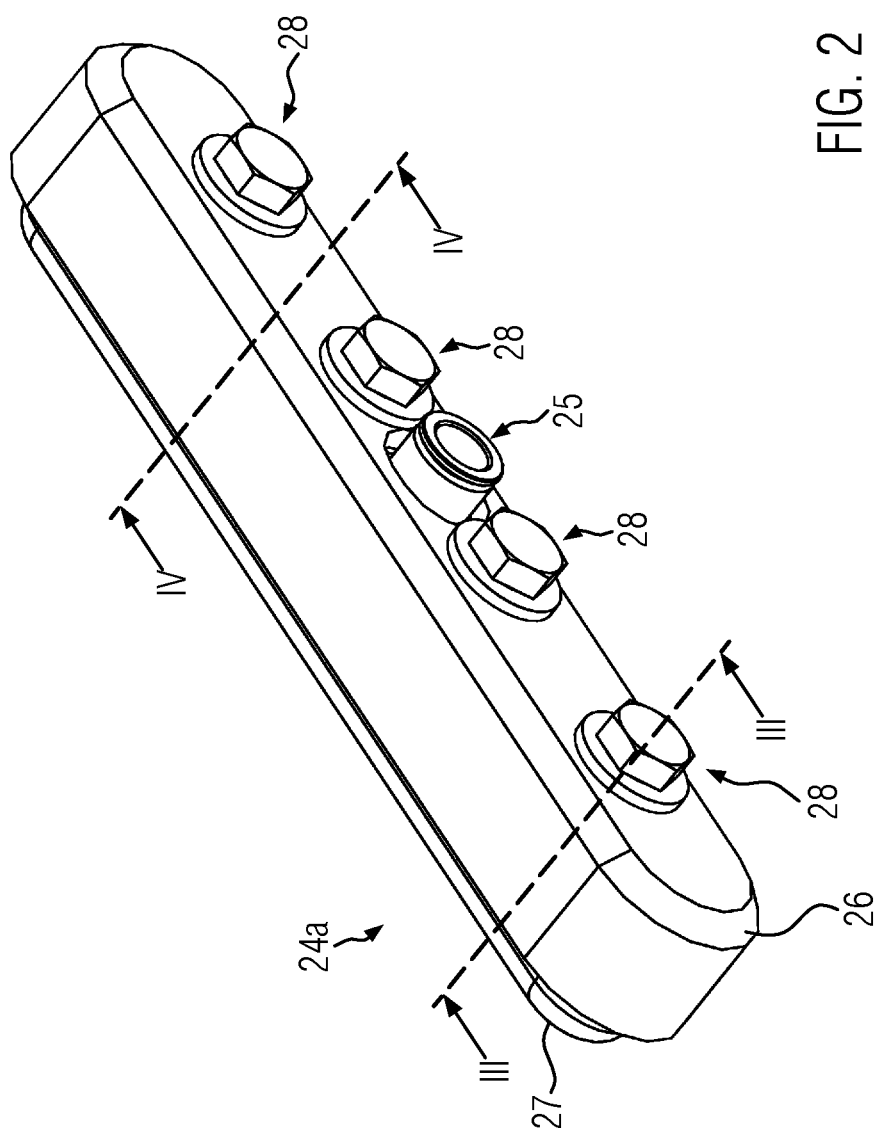
FIG. 2 shows a perspective view of a seal of a lifting actuator.

FIG. 2 shows a perspective view of the first seal 24*a*. Even if it is referred to the first seal 24*a* in the following, the explanations are applicable to the second seal 24*b* as well. In the present embodiment, the first seal 24*a* may have a connector 25. The latter may be configured to conduct a working fluid, air in the present embodiment, through the first seal 24*a* into the hose 23 and/or out of it. The second seal 24*b* may have a connector 25 as well or may be embodied without such a connector.

The first seal 24*a* may include a seal cap 26. The seal 24*a* may further include an insert 27. The seal cap 26 and the insert 27 may be screwable to one another. For this purpose, one or more screw connections 28 may be provided. Each of the screw connections 28 may comprise for example a screw 29 and a thread 30, which may be provided in the insert 27 (see FIG. 3A). Each of the screw connections 28 may pull the inserts 27 and the seal cap 26 towards each other in a pulling direction Z.

Figure 3A:
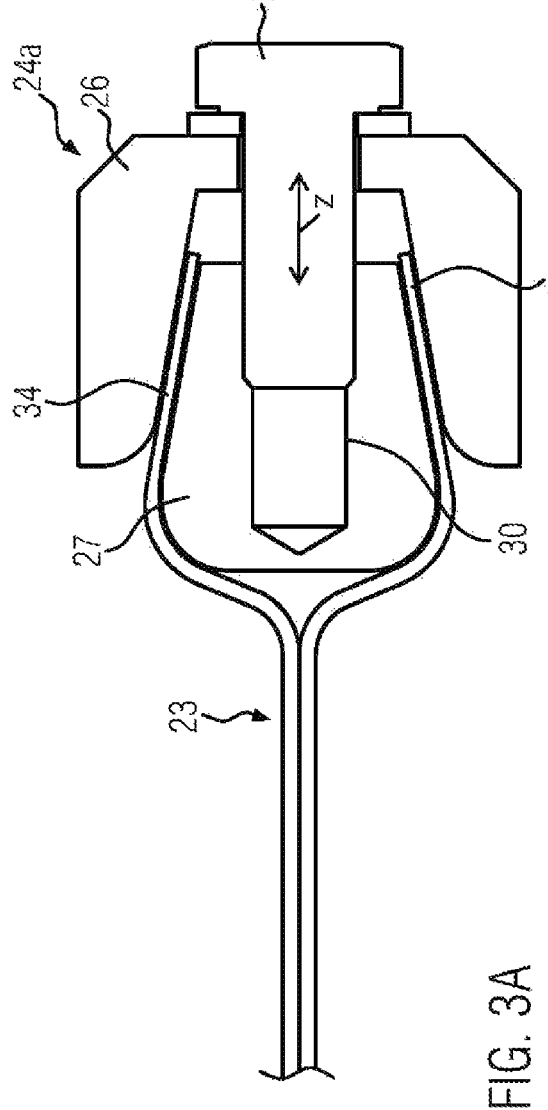
FIG. 3A shows a schematic side view of the seal, wherein the cutting plane is oriented as indicated at line III-III in FIG. 2.
Figure 3B:
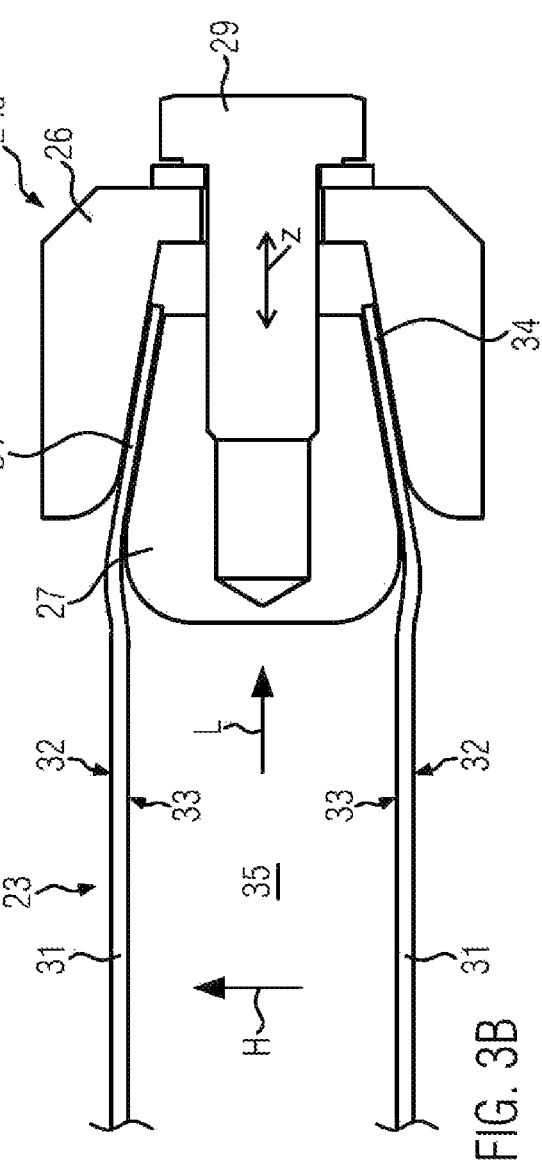
FIG. 3B shows the view from FIG. 3A, wherein the lifting actuator is shown in an inflated state.

FIG. 3A shows a schematic sectional view of the seal 24*a* in a perspective indicated at III-III in FIG. 2. In this view, the hose 23 can be seen as well. The latter is shown in a substantially deflated state. FIG. 3B shows the view from FIG. 3A. However, the hose 23 is shown in an inflated state. The hose 23 may have a wall 31. The wall 31 may in turn have an outer surface 32. It may further have an inner surface 33. As can be seen in FIGS. 3B and 3A, the insert 27 may engage the inner surface 33 of the wall 31. Further, the seal cap 26 may engage the outer surface 32 of the wall 31. As a result, a clamping portion 34 of the wall 31 may be clamped in a fluid tight manner between the insert 27 and the seal cap 26.

The wall 31 of the hose 23 may on the one hand extend in an axial direction L, which may be defined between the first and second seals 24*a*, 24*b*. The wall 31 may on the other hand extend in a circumferential direction (not shown). The first and second seals 24*a*, 24*b* may seal an inner space 35 of the hose 23 in the axial direction L. The wall 31 of the hose 23 may seal the inner space 35 in a plurality of radial directions each extending orthogonal to the axial direction L. By filling the hose 23 and its corresponding expansion, a component to be lifted, such as the lower tool 12*b* in the present embodiment, may be lifted in a lifting direction H.

Figure 4A:
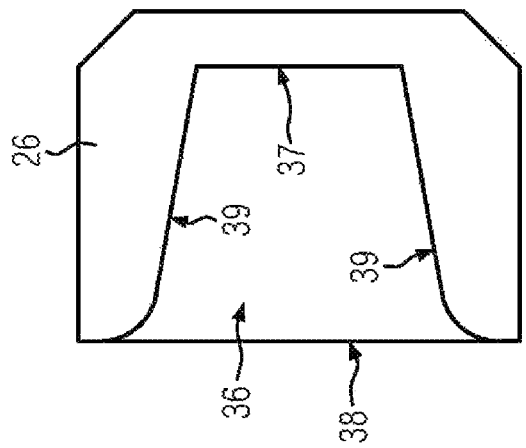
FIG. 4A shows a schematic sectional view of a seal cap of the seal, wherein the sectional plane is oriented as indicated at line IV-IV in FIG. 2.

In FIG. 4A, only the seal cap 26 is shown in a sectional view, wherein the section is indicated at lines IV-IV in FIG. 2. Therein, it may be more clearly seen that the seal cap 26 may have a recess 36. The recess may have a bottom surface 37. It may further have an opening plane 38. It should be appreciated, that the opening plane 38 itself is not a material surface but is only framed by the material of the seal cap 26. The recess 36 may further comprise a wall surface 39, which may extend between the bottom surface 37 and the opening plane 38. While the seal cap 26 engages the outer surface 32 of the wall 31, in particular the wall surface 39 of the seal cap 26 may engage the outer surface 32 of the wall 31. As indicated in FIG. 4A, the opening plane 38 may have an area, which is larger than the area of the bottom surface 37. Accordingly, the recess 36 may be tapered.

Figure 4B:
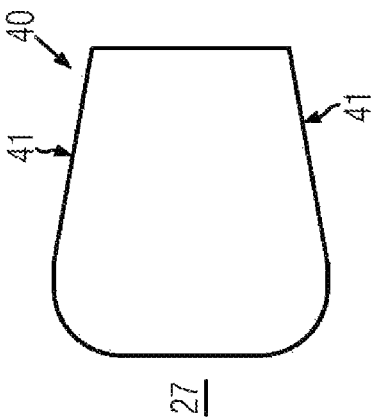
FIG. 4B shows a schematic sectional view of an insert of the seal, wherein the sectional plane is oriented as indicated at line IV-IV in FIG. 2.

FIG. 4B also shows a sectional view, wherein the section is oriented as indicated at lines IV-IV. However, in FIG. 4B, only the insert 27 is shown. As can be seen, the insert 27 may have a tapered portion 40. In addition, the insert 27 may have a clamping surface 41. The clamping surface 41 and the wall surface 39 of the seal cap 26 may be adjusted with respect to each other such that the insert 27 is insertable into the recess 36 of the seal cap 26. The clamping surface 41 may engage the inner surface 33 of the wall 31 of the hose 23.

As already mentioned, any embodiments referring to the first seal 24*a* are applicable to the second seal 24*b* as well. It is to be appreciated that the second seal 24*b* may also be embodied without a connector 25. Embodiments, in which the first seal 24*a* does not have a connector 25, are conceivable as well, although these are less preferred, as explained above.

What is claimed is:

1. A working station for a packaging machine, the working station comprising:
   a lifting unit having a pressure source and a lifting actuator connected to the pressure source, wherein the lifting unit or the lifting actuator is configured to lift a component of the working station, and the lifting actuator comprises:
   a hose comprising a wall having an inner surface and an outer surface disposed opposite the inner surface; and
   a seal having a seal cap engaging the outer surface, and an insert engaging the inner surface, wherein the seal clamps a clamping portion of the wall of the hose between the insert and the seal cap in a fluidtight manner, wherein a pulling direction of a screw connection for screwing the seal cap to the insert is oriented at an angle with respect to a lifting direction of the lifting actuator, wherein the angle is larger than 0°.

2. The working station according to claim 1, wherein the seal clamps the clamping portion of the wall of the hose between the insert and the seal cap in a gastight manner.

3. The working station according to claim 1, wherein the seal cap has a recess in which the insert is insertable.

4. The working station according to claim 3, wherein an opening plane of the recess has a larger area than a bottom surface of the recess.

5. The working station according to claim 1, wherein the insert has a tapered portion.

6. The working station according to claim 1, wherein the seal has a connector, which is configured to conduct a working fluid through the seal into the hose and/or out of the hose.

7. The working station according to claim 1, wherein the seal has a connector, which is configured to conduct a gas through the seal into the hose and/or out of the hose.

8. The working station according to claim 1, wherein the seal comprises an additional screw connection for connecting the insert and the seal cap to one another.

9. The working station according to claim 1, wherein the angle is larger than 45°.

10. The working station according to claim 1, wherein the angle is 90°.

11. The working station according to claim 1, wherein the seal is provided on one section of the hose, and the lifting actuator further comprises an additional seal provided on an opposite section of the hose.

12. The working station according to claim 1, wherein the working station is a sealing station or a cutting station or a forming station.

13. A packaging machine comprising the working station according to claim 1.

14. The working station according to claim 1, wherein the seal cap has a tapered recess, and the insert has a tapered portion that is configured to be received in the tapered recess so that the clamping portion of the wall of the hose is clamped between the seal cap and the tapered portion of the insert.

15. The working station according to claim 14, wherein the seal has a connector that is spaced laterally away from the screw connection, and wherein the connector is configured to conduct a working fluid through the seal into the hose and/or out of the hose.

16. The working station according to claim 15, wherein the seal comprises an additional screw connection for connecting the insert and the seal cap to one another, and wherein the connector is positioned between the screw connection and the additional screw connection.

17. The working station according to claim 15, wherein the seal cap has an opening plane at one end through which the insert is received, and an additional opening at an opposite end through which a screw of the screw connection is received.

18. The working station according to claim 15, wherein the hose and a screw of the screw connection are oriented in an axial direction, and wherein the hose is Tillable so that a portion of the wall of the hose disposed outside of the seal is movable in a direction transverse to the axial direction in order to lift the component of the working station in the lifting direction.

19. The working station according to claim 18, wherein the seal cap has an opening plane at one end through which the insert is received, and an additional opening at an opposite end through which the screw of the screw connection is received.

20. A working station for a packaging machine, the working station comprising:
a lifting unit having a pressure source and a lifting actuator connected to the pressure source, wherein the lifting actuator comprises:
a hose comprising a wall having an inner surface and an outer surface disposed opposite the inner surface; and
a seal having a seal cap engaging the outer surface, and an insert engaging the inner surface, wherein the seal clamps a clamping portion of the wall of the hose between the insert and the seal cap in a fluidtight manner, the insert and the seal cap are connected to one another by a screw connection, the hose and a screw of the screw connection are oriented in an axial direction, and the hose is fillable so that a portion of the wall of the hose disposed outside of the seal is movable in a direction transverse to the axial direction in order to lift a component of the working station in a lifting direction.

* * * * *

UNITED STATES PATENT AND TRADEMARK OFFICE
CERTIFICATE OF CORRECTION

| | |
|---|---|
| PATENT NO. | : 11,279,507 B2 |
| APPLICATION NO. | : 16/931023 |
| DATED | : March 22, 2022 |
| INVENTOR(S) | : Konrad Moessnang et al. |

It is certified that error appears in the above-identified patent and that said Letters Patent is hereby corrected as shown below:

In the Claims

Column 8, Line 1, Claim 18:
After "and wherein the hose is"
Delete "Tillable" and
Insert -- fillable --.

Signed and Sealed this
Twelfth Day of July, 2022

*Katherine Kelly Vidal*

Katherine Kelly Vidal
*Director of the United States Patent and Trademark Office*